US006903926B2

United States Patent
Masuda et al.

(10) Patent No.: US 6,903,926 B2
(45) Date of Patent: Jun. 7, 2005

(54) HIDEABLE ACCESSORY PLATFORM

(75) Inventors: Kuni Masuda, Cupertino, CA (US); Joe Miseli, San Bruno, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 170 days.

(21) Appl. No.: 10/096,351

(22) Filed: Mar. 11, 2002

(65) Prior Publication Data

US 2003/0169564 A1 Sep. 11, 2003

(51) Int. Cl.⁷ .................................................. G06F 1/16
(52) U.S. Cl. ........................ 361/681; 361/683; 361/724
(58) Field of Search ................................. 361/679, 681, 361/683–686, 724–727, 687

(56) References Cited

U.S. PATENT DOCUMENTS 5,801,919 A * 9/1998 Griencewic .................. 361/683

* cited by examiner

Primary Examiner—Yean-Hsi Chang
(74) Attorney, Agent, or Firm—Meyertons Hood Kivlin Kowert & Goetzel, P.C.; B. Noël Kivlin

(57) ABSTRACT

An apparatus for mounting an accessory to a flat panel monitor is disclosed. The apparatus comprises an arm nestably mounted in an aperture in the flat panel monitor. The arm is extendable between a nested position and an extended position. The arm is also adapted to pivot in the extended position.

6 Claims, 4 Drawing Sheets

HIDEABLE ACCESSORY PLATFORM

BACKGROUND

1. Field

The present system relates to computer monitors. More specifically, the present system relates to hideable platforms for accessories located in computer flat panel monitors.

2. Background

Video cameras are common computer accessories these days. Computer accessories, such as video cameras, may be used to perform various functions such as video conferencing, video capture, security, video detailing, etc. Until recently, the positioning of computer accessories such as a video camera was not an issue. For instance, many monitors including cathode ray tube (CRT) monitors had a wide profile and an accessory could be placed atop these wide profile monitors in a stable manner.

However, flat panel monitors have a thinner profile. The thinner profile on a flat panel monitor can create potential problems when positioning an accessory such as a video camera to sit atop a flat panel monitor. Thus, there is a need for a system which will provide platform for an accessory such as a video camera associated with monitors including a thin profile flat panel monitor.

DEATILED DESCRIPTION OF THE DRAWINGS

Those of ordinary skill in the art will realize that the following description of the present system is illustrative only and not in any way limiting. Other embodiments will readily suggest themselves to such skilled persons having the benefit of this disclosure.

Similar designations used herein are intended to designate substantially similar matter.

Figure 1:
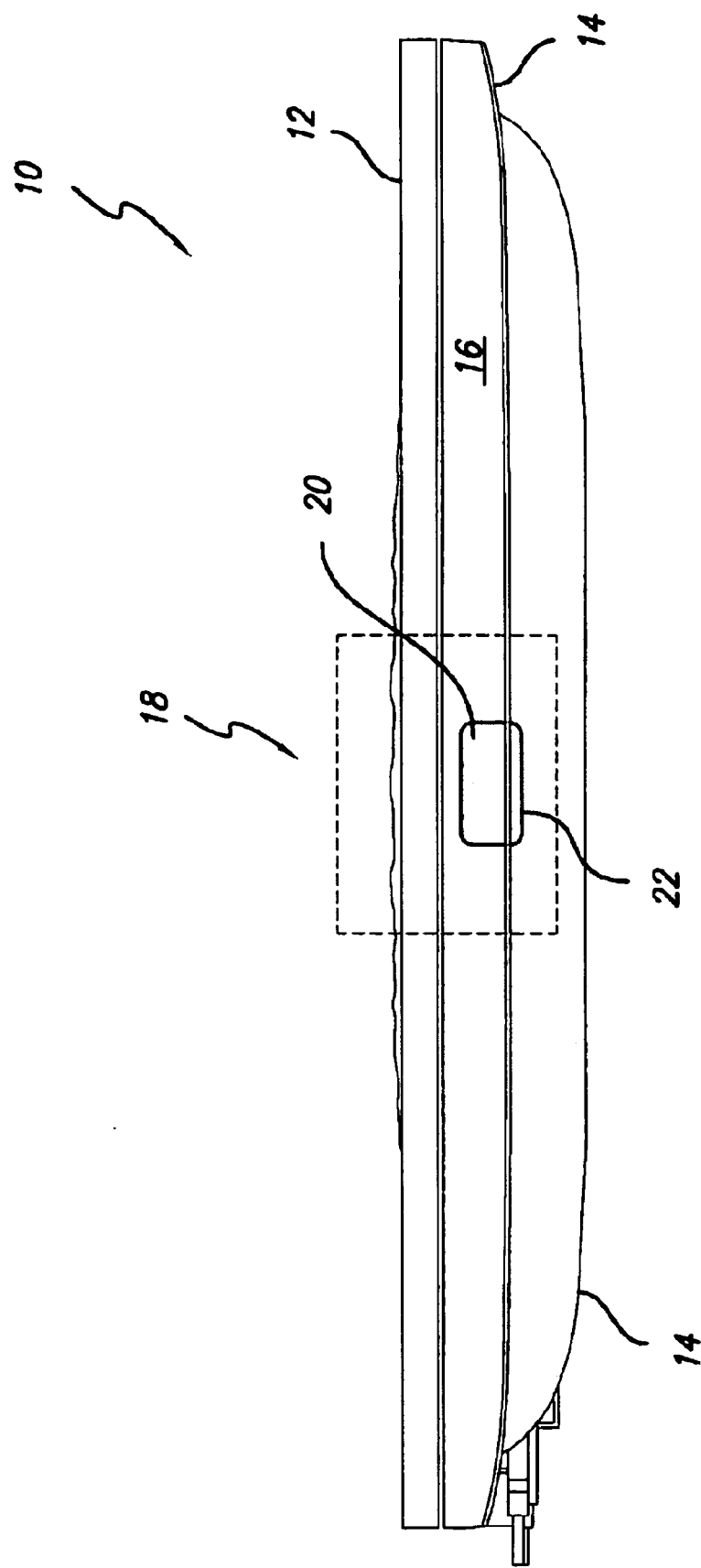
FIG. 1 is a drawing of top view of a flat panel monitor having an extendable/retractable accessory arm of the present system.

FIG. 1 shows one embodiment of a disclosed extendable/retractable accessory arm system 10 configured for use the teachings of this disclosure. The embodiment depicted in FIG. 1 is deployed on a flat panel monitor, though this is but one illustrative example of a disclosed system. Monitor as used in this disclosure may include the housing for various types of display systems including, but not limited to, flat panel monitors.

As will be appreciated by those of ordinary skill in the art having the benefit of this disclosure, the disclosed system may be used on any variety of electronic devices including various types of monitors requiring accessories such as a video camera. Also, as will be appreciated by those skilled in the art having the benefit of this disclosure, the extendable/retractable accessory arm of the present system may be situated on any surface area of the monitor including, but not limited to, the top, bottom and sides. FIG. 1 is shown as an illustrative example only and in no way limits the disclosed system.

Still referring to FIG. 1 a top view of a flat panel monitor having a front display surface 12 and a rear surface 14 is illustrated. Also shown in FIG. 1 is upper surface 16 of a flat panel monitor. For example, upper surface 16 may be approximately 2¼" in width. However, upper surface can be any variety of widths due to the number of types of monitors being manufactured or being designed for future manufacture. Due to the potentially thin profile of upper surface 16, it may be difficult to place objects or accessories, particularly a camera atop upper surface 16. However, as shown in FIGS. 1–4, extendable/retractable accessory arm system 10 solves this problem. Extendable/retractable accessory arm 18 as shown on a flat panel monitor in FIGS. 1 through 4 is an example only. As will be appreciated by those skilled in the art having the benefit of this disclosure, extendable/retractable accessory arm 18 of the present system may be situated on any surface area of the monitor including, but not limited to, top, bottom and sides.

Disposed on upper surface 16 is extendable/retractable accessory arm system 10. Accessory arm 18 is shown in a nested position in FIG. 1. As revealed in FIG. 1, when accessory arm 18 is in a nested position, accessory arm 18 is level with upper surface 16 of a flat panel monitor. Accessory arm 18 has a surface portion 20, which when in a nested position becomes part of upper surface 16 of a flat panel monitor. However, in another aspect of the disclosed system, accessory arm 18 may also sit above or below upper surface 16. How accessory arm 18 sits when nested is a design choice and can be changed without departing from the spirit of the inventive concept disclosed herein. In one aspect of the system, accessory arm 18 also has a tab portion 22 that has a recessed surface just below upper surface 16 such that a user may lift tab portion 22 for access to accessory arm 18 in an extended position. In another aspect of the system accessory arm 18 be spring loaded in which case a user would depress the surface portion of accessory arm 18 to release accessory arm 18 from the nested position. In yet another aspect of the system, accessory arm 18 may have a mechanical or electrical mechanism for accessing accessory arm 18 from its nested position.

Extendable/retractable accessory arm 18 can be can be formed from any number of resilient materials such as plastic, aluminum, stainless steel or any other material known in the art suitable for the intended use.

Figure 2:
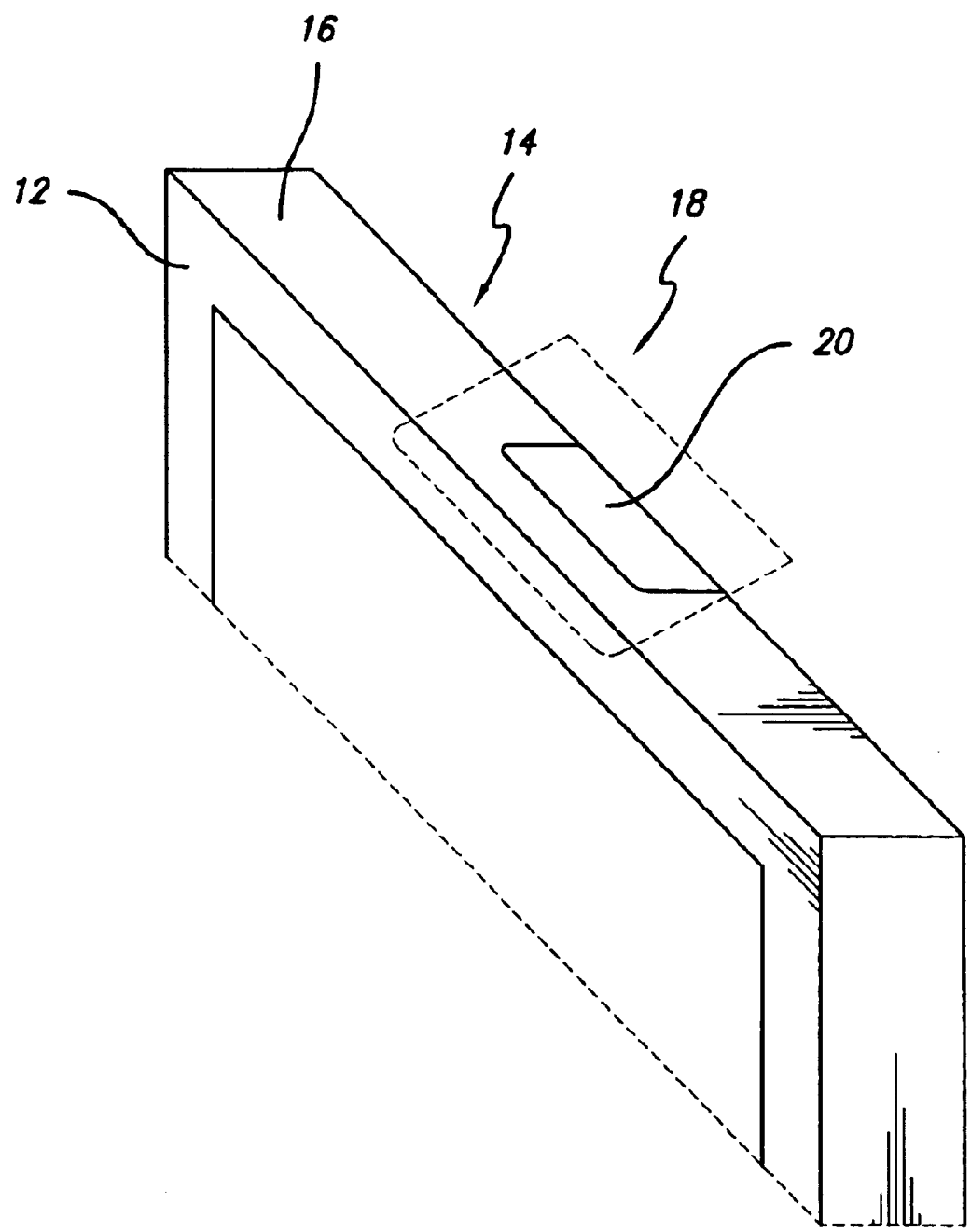
FIG. 2 is a drawing of an elevated perspective view of the top of a flat panel monitor having an extendable/retractable accessory arm of the present system.

FIG. 2 is an elevated perspective view of the top of a flat panel monitor having extendable/retractable accessory arm 18 of the present system. As shown more clearly in FIG. 2, when accessory arm 18 is in a nested position, accessory arm 18 is level with upper surface 16 of a flat panel monitor. Accessory arm 18 has a surface portion 20, which when in a nested position becomes part of upper surface 16 of a flat panel monitor. In an example configuration, surface portion 20 may be approximately ¾" wide and approximately 2½" long.

Figure 3:
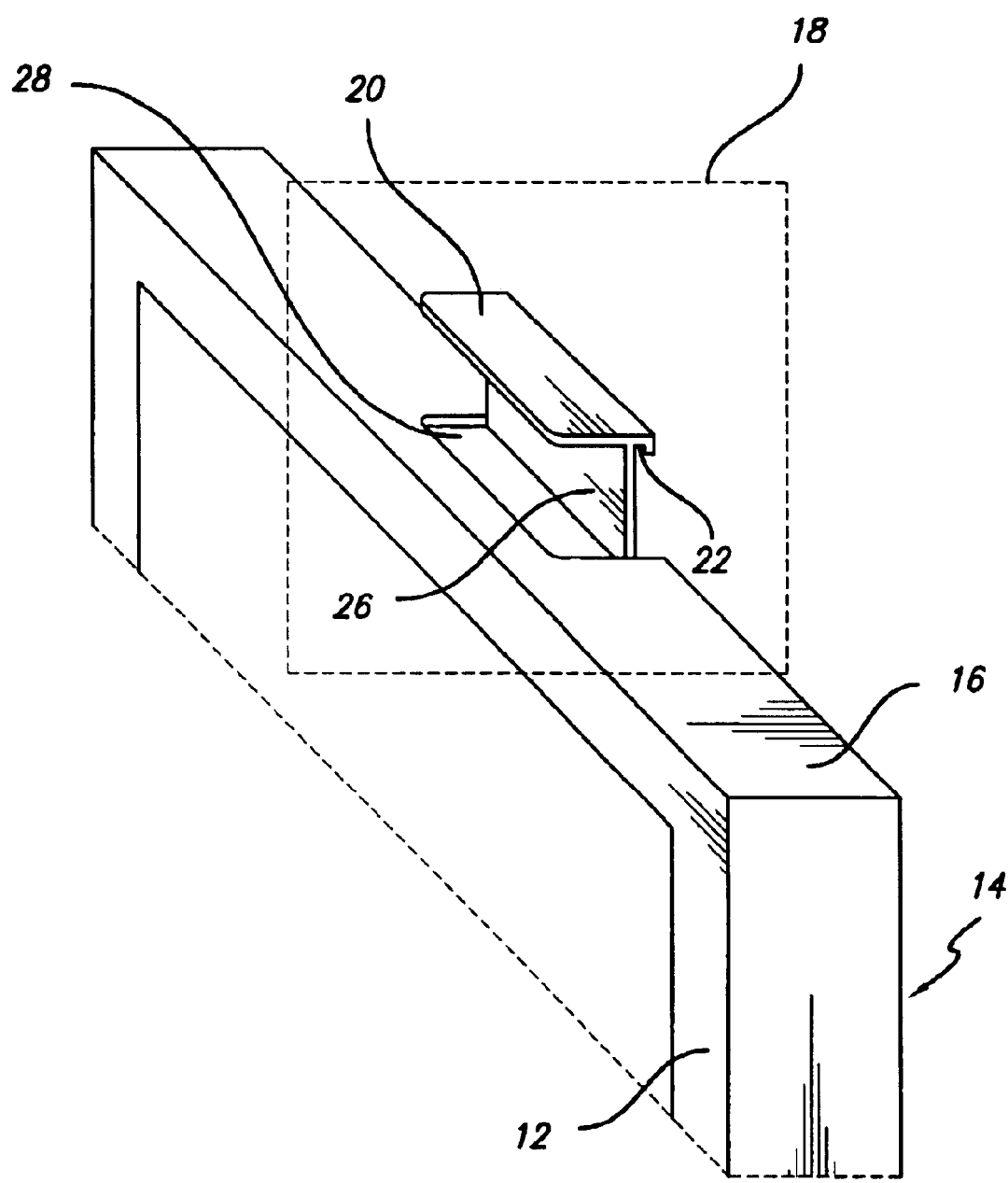
FIG. 3 is a drawing of an elevated perspective view of the top of a flat panel monitor having an extendable/retractable accessory arm of the present system having the accessory arm in a semi-extended position.

FIG. 3 is an elevated perspective view of the top of a flat panel monitor having an extendable/retractable accessory arm 18 of the present system in a semi-extended position. In one aspect of the present system, surface portion 20 is rectangular shaped with slightly rounded edges. It is contemplated that surface portion 20 may be any variety of shapes including semi-circular. Surface portion 20 when nested rests in recessed area 28. In one aspect of the disclosed system, surface portion may be illuminated. Recessed area 28 is deep enough to accommodate nested surface portion 20 such that, when nested, surface portion is level with top surface 16 of the LCD flat panel monitor. Extendable/retractable accessory arm 18 has a rectangular member 26 that is perpendicular to surface portion 20 when in a fully extended position. As shown in FIG. 3, extendable/retractable accessory arm 18 is lifted via tab area 22 from the rear surface 14 of a flat panel monitor to a semi-extended position. As stated previously, it is contemplated that extendable/retractable accessory arm 18 may be situated on any surface of a flat panel monitor. It is also contemplated that extendable/retractable accessory arm 18 may be accessed by a variety of means other than tab portion 22 including depression of surface area 20 or a mechanical or electrical means.

Figure 4:
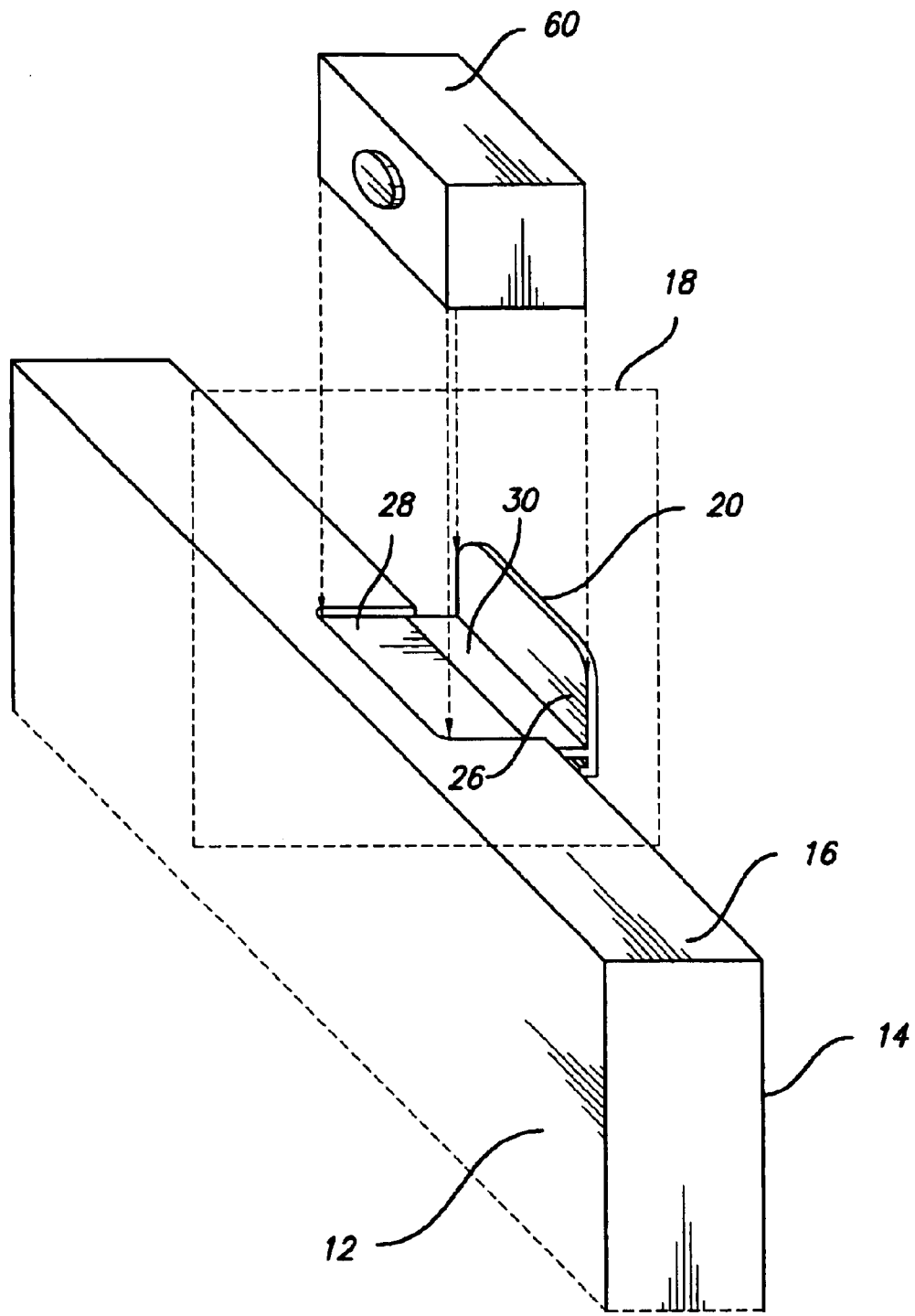
FIG. 4 is a drawing of an elevated perspective view of the top of a flat panel monitor having an extendable/retractable accessory arm of the present system having the accessory arm in a fully extended position.

FIG. 4 shows accessory arm 18 in a fully extended position. As shown in FIG. 4, once rectangular member 26 is fully extended upwards, it then rotates on rotatable joining member 30 towards the rear surface 14 of the LCD flat panel monitor. Rectangular member 26 is coupled to the rear surface 14 of the flat panel monitor though rotatable joining member 30. Rotatable joining member can be any device known to those of ordinary skill in the art such as a hinge that allows for movement on at least one plane. In another aspect of the invention, rotatable joining member can be any device that allows for movement on two or more planes.

Referring still to FIG. 4, it is shown that when accessory arm 18 is in a fully extended position, rectangular member 26 is level with recessed area 28. Rectangular member may be approximately 1½" in length and approximately 2" in width in its extended position. To return accessory arm to a nested position the user rotates the rectangular member 26 upwards towards the front surface 12 of the flat panel monitor on rotatable joining member 30 until accessory arm 18 is fully upright. Accessory arm 18 then slides back to a nested position within the flat panel monitor. In another aspect of the present system, extendable/retractable accessory arm 18 can also include an attaching means such as a screw or double face tape or the like.

A method for mounting a camera or other accessory 60 will now be disclosed. In one aspect, a method may comprise the following steps. It is to be understood that the following acts may be accomplished in a variety of manners using a wide array of equipment. First, a flat panel display mounted in a case is provided. The case of the flat panel display has an aperture 28 located on a surface 16 of the case. In the present example, the aperture 28 is located on the upper surface 16. Next, an arm 18 for holding the accessory (or other accessory) 60 is provided and nested in the aperture 28. The arm 18 is extendable/retractable between the nested position and the extended position. The arm 18 is adapted to pivot while in the extended position to a plane that is suitable for mounting the camera 60. The distal end of the arm 18 has a flat surface or a coupling 26 for mounting the camera or other accessory 60. Next, a camera or other accessory 60 is provided, the camera or other accessory 60 may have a base that is optimized to mate with the arm 18 when the arm 18 is in the extended position. Finally, the accessory base is coupled with or situated upon the extended arm 18.

While embodiments and applications of this system have been shown and described, it would be apparent to those skilled in the art that many more modifications than mentioned above are possible without departing from the inventive concepts herein. The system, therefore, is not to be restricted except in the spirit of the appended claims.

What is claimed is:

1. An apparatus for mounting a stand alone accessory to a flat panel monitor, said flat panel monitor including a housing having an aperture located therein and a plurality of outer surfaces, comprising:

an arm nestably mounted in said aperture, said arm being extendable between a nested position and an extended position, pivotable to a supporting position, and comprising:
   a first surface that is substantially aligned with one of said plurality of outer surfaces when said arm is in said nested position; and
   a second surface that is substantially parallel to a display located within said housing when said arm is in said nested position and substantially perpendicular to said display when said arm is in said supporting position, said second surface being adapted to optimally support said stand alone accessory when said arm is in said supporting position.

2. The apparatus according to claim 1 wherein said arm further comprises a coupling for mounting the stand alone accessory thereto.

3. The apparatus according to claim 2 wherein said arm further comprises a lip for manually moving said arm from said nested position to said extended position.

4. The apparatus according to claim 1 further comprising a rotatable member for connecting said arm to said housing, said rotatable member being adapted to pivot said second surface from a first position in a first plane to at least one second position in a second plane, said second plane being substantially perpendicular to said display and substantially tangential to an upper one of said plurality of outer surfaces.

5. The apparatus according to claim 1 further comprising a rotatable member for connecting said arm to said housing, said rotatable member being adapted to pivot said second surface from a first position in a first plane to at least one second position in a second plane, said second plane being substantially perpendicular to said display and substantially tangential to a side one of said plurality of outer surfaces.

6. The apparatus according to claim 1 further comprising a rotatable member for connecting said arm to said housing, said rotatable member being adapted to pivot said second surface between a first and at least one second position in a first and second plane, respectively.

* * * * *